(12) United States Patent
Fischer et al.

(10) Patent No.: US 9,692,221 B2
(45) Date of Patent: Jun. 27, 2017

(54) JUNCTION BOX AND CONTACTOR DEVICE (75) Inventors: Daniela Fischer, Suzhou (CN); Bing Han, Suzhou (CN); Ai Xia Shen, Suzhou (CN); Long Tao Wang, Suzhou (CN); Nan Yu, Suzhou (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 135 days.

(21) Appl. No.: 14/411,546

(22) PCT Filed: Jul. 13, 2012

(86) PCT No.: PCT/CN2012/078651
§ 371 (c)(1),
(2), (4) Date: May 13, 2015

(87) PCT Pub. No.: WO2014/008671
PCT Pub. Date: Jan. 16, 2014

(65) Prior Publication Data
US 2015/0318681 A1 Nov. 5, 2015

(51) Int. Cl.
*H02G 3/08* (2006.01)
*H02G 15/02* (2006.01)
(Continued)

(52) U.S. Cl.
CPC .......... *H02G 15/02* (2013.01); *H01H 50/021* (2013.01); *H01H 50/045* (2013.01);
(Continued)

(58) Field of Classification Search
CPC ..................................................... H01R 4/363
See application file for complete search history.

(56) References Cited

U.S. PATENT DOCUMENTS 5,689,143 A  11/1997 Nikles
6,285,271 B1  9/2001 Bauer et al.
(Continued)

FOREIGN PATENT DOCUMENTS

CN  1262774 A  8/2000
CN  101123152 A  2/2008
(Continued)

OTHER PUBLICATIONS

International Search Report PCT/ISA/210 for International Application No. PCT/CN2012/078651 Dated Apr. 4, 2013.
(Continued)

*Primary Examiner* — Hung V Ngo
(74) *Attorney, Agent, or Firm* — Harness, Dickey & Pierce, P.L.C.

(57) ABSTRACT

An electrical junction box includes a casing, a first installation space, a second installation space, and a connection part arranged in the casing the connection part includes a main body, a first connection end, and a second connection end. The main body is used for connecting to a cable; the first connection end, connected to the main body, is located in the first installation space, and is used for connecting to a contactor; and the second connection end, arranged on the first connection end, is located in the second installation space, and may be used for connecting to a resistance wire. The resistance wire may be connected to the second connection end without passing over the junction box, which is not only advantageous for fastening and installing the junction box, but also facilitates the connection and installation of the cable.

18 Claims, 6 Drawing Sheets

(51) Int. Cl.
    *H02G 3/18*     (2006.01)
    *H01R 4/36*     (2006.01)
    *H01H 50/02*     (2006.01)
    *H01H 50/04*     (2006.01)
    *H01H 50/14*     (2006.01)
    *H01H 71/08*     (2006.01)
    *H01H 50/54*     (2006.01)

(52) U.S. Cl.
    CPC .......... *H01H 50/14* (2013.01); *H01H 50/543* (2013.01); *H01H 71/08* (2013.01); *H01R 4/363* (2013.01); *H02G 3/083* (2013.01); *H02G 3/18* (2013.01)

(56) References Cited

U.S. PATENT DOCUMENTS

| | | | |
|---|---|---|---|
| 7,540,792 | B2 | 6/2009 | Ananthakrishnan et al. |
| 7,798,869 | B1 | 9/2010 | Konopacki et al. |
| 2006/0105637 | A1* | 5/2006 | Chiang .................. H01R 4/363 439/709 |
| 2008/0055025 | A1 | 3/2008 | Ananthakrishnan et al. |
| 2008/0123256 | A1* | 5/2008 | Fuzetti ................... H01R 4/363 361/648 |
| 2009/0011660 | A1* | 1/2009 | Hagmann ............... H01R 4/307 439/801 |
| 2009/0311921 | A1* | 12/2009 | Kaine .................... H01R 4/363 439/798 |
| 2010/0144212 | A1* | 6/2010 | Tiberio, Jr. ............. H01R 13/41 439/733.1 |
| 2012/0077355 | A1* | 3/2012 | Borst ................. H01R 12/7064 439/55 |
| 2013/0252486 | A1* | 9/2013 | Kosyanchuk .......... H01R 4/363 439/813 |

FOREIGN PATENT DOCUMENTS

| | | |
|---|---|---|
| CN | 202019055 U | 10/2011 |
| DE | 29601735 U1 | 3/1996 |
| DE | 19729595 C1 | 10/1998 |
| EP | 0905733 A2 | 3/1999 |
| JP | 2000222996 A | 8/2000 |

OTHER PUBLICATIONS

Written Opinion of the International Searching Authority PCT/ISA/237 for International Application No. PCT/CN2012/078651 Dated Apr. 4, 2013.

Extended European Search Report dated Jan. 7, 2016.

* cited by examiner

JUNCTION BOX AND CONTACTOR DEVICE

PRIORITY STATEMENT

This application is the national phase under 35 U.S.C. §371 of PCT International Application No. PCT/CN2012078651 which has an International filing date of Jul. 13, 2012, which designated the United States of America, the entire contents of each of which are hereby incorporated herein by reference.

FIELD

At least one embodiment of the present invention generally relates to a junction box, particularly to a junction box with a feeder function, and a contactor device using the junction box.

BACKGROUND

For a new capacitive load contactor, there are six resistance wires needing to be connected to the contactor, and a contactor of a small size further needs to be connected to a thicker cable; therefore, a junction box is usually needed to be connected with the contactor.

Figure 1:
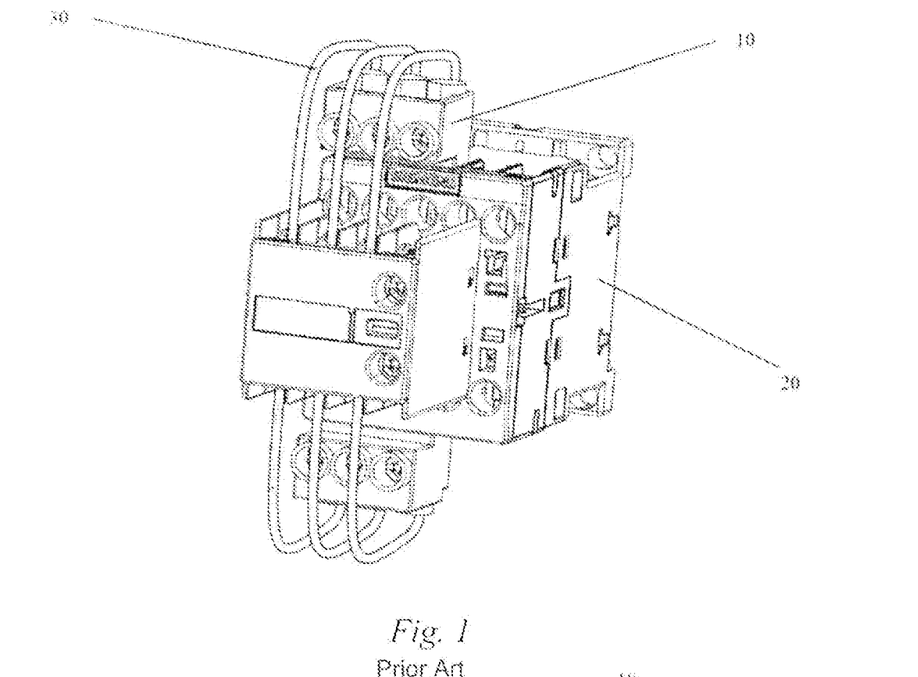
FIG. 1 is a schematic structural diagram of a junction box combined with a contactor in the prior art.
Figure 2:
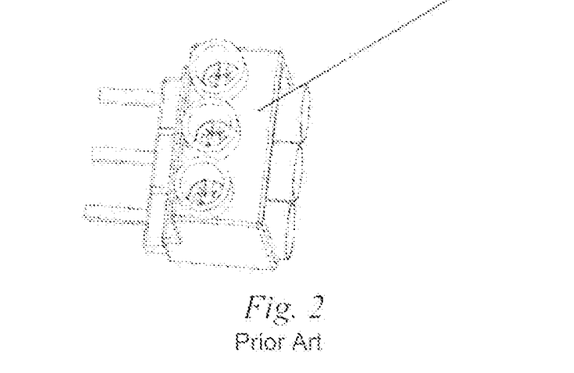
FIG. 2 is an enlarged schematic diagram of the junction box in FIG. 1.
Figure 3:
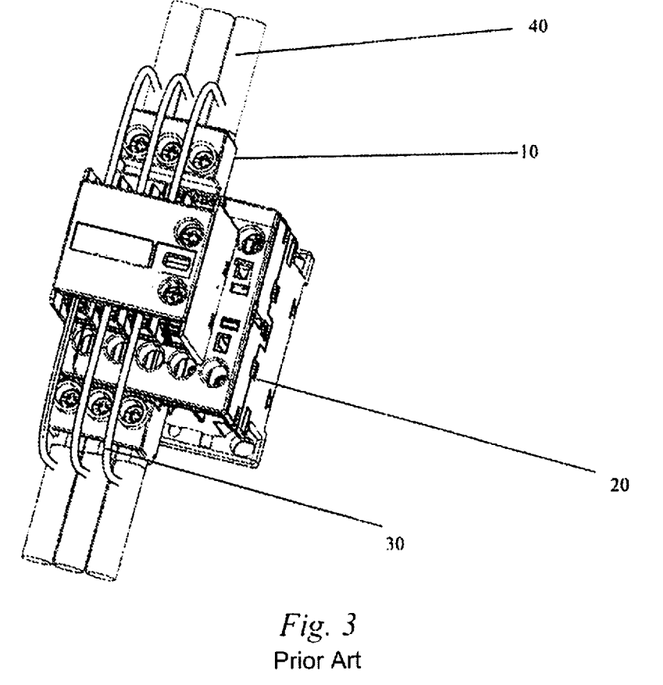
FIG. 3 is a schematic structural diagram of the junction box and the contactor in FIG. 1 further combined with a cable.

FIGS. 1-3 are schematic structural diagrams of a combination of a junction box 10 and a contactor 20 in the prior art. As shown in FIGS. 1-3, a resistance wire 30 lies over the junction box 10, which neither is advantageous for fastening and installing the junction box 10, nor facilitates the connection and installation of a cable 40.

SUMMARY

A technical problem to be solved by at least one embodiment of the present invention is to provide a junction box which is simple to install.

At least one embodiment of the present invention is realized in that: an electrical junction box is provided, which includes a casing, a first installation space, a second installation space, and a connection part arranged in the case body; the connection part includes a main body, a first connection end, and a second connection end; the main body is used for connecting to a cable; the first connection end is connected to the main body, is located in the first installation space, and is used for connecting to a contactor; and the second connection end is arranged on the first connection end and is located in the second installation space.

At least one embodiment of the present invention further provides a contactor device, comprising a contactor, a resistance wire, and a cable; the contactor further comprises the above-mentioned junction box; the first connection end is connected to the contactor; the resistance wire is connected to the second connection end; the main body is connected to the cable; a joint between the first connection end and the contactor, and a joint between the resistance wire and the second connection end are located on one side of the junction box; and a joint between the main body and the cable is located on the other, opposite side of the junction box.

BRIEF DESCRIPTION OF THE DRAWINGS

The above description is only an overview of the technical solution of embodiments of the present invention. In order to understand the technical details of the present invention more clearly so as to be able to implement same according to the contents of the description, and make the abovementioned and other objects, features and advantages of the present invention more apparent and easy to understand, detailed descriptions are made as follows with preferred embodiments in conjunction with the accompanying drawings.

DETAILED DESCRIPTION OF THE EXAMPLE EMBODIMENTS

At least one embodiment of the present invention is realized in that: an electrical junction box is provided, which includes a casing, a first installation space, a second installation space, and a connection part arranged in the case body; the connection part includes a main body, a first connection end, and a second connection end; the main body is used for connecting to a cable; the first connection end is connected to the main body, is located in the first installation space, and is used for connecting to a contactor; and the second connection end is arranged on the first connection end and is located in the second installation space.

Further, the main body is located on one side of the junction box, and the first connection end and the second connection end are located on the other, opposite side of the junction box.

Further, an installation hole is formed inside the main body, and the installation hole is used for accommodating the cable.

Further, the first connection end comprises a first extension part, a second extension part, a third extension part, and a fourth extension part; the first extension part extends into the installation hole and is connected to the main body; the second extension part is formed by bending and extending from the first extension part and is perpendicular to the first extension part; the third extension part is formed by bending and extending from the second extension part, and the third extension part is perpendicular to the second extension portion and parallel to the first extension part; and the fourth extension part is formed by bending and extending from the third extension part and is parallel to the third extension part.

Further, the second connection end is arranged on the first connection end; the second connection end comprises a first extension structure, a second extension structure, and a third extension structure; the first extension structure is perpendicularly arranged on the third extension part and extends from the third extension part; the second extension structure is bent from the first extension structure until it is opposite to the third extension part and parallel to the third extension part; the third extension structure perpendicularly extends from the second extension structure; and when the connection part is assembled to the casing, the third extension structure extends into the second installation space, and is used for connecting to a resistance wire. Further, the casing comprises a first layer and a second layer arranged above the first layer; the first layer comprises a plurality of first installation spaces arranged at intervals; and the second layer comprises a plurality of second installation spaces arranged at intervals.

Further, the second installation spaces correspond to the first installation spaces in a one to one manner.

Further, a plurality of connection holes used for installing the resistance wires are also formed on the second layer; the connection holes are in communication with the second installation spaces after penetrating the top of the second layer; and the connection holes correspond to the second installation spaces in a one to one manner.

Further, the first connection end comprises a first extension part, a second extension part, a third extension part, and a fourth extension part; the first extension part is connected to the main body; the second extension part is formed by bending and extending from the first extension part and is perpendicular to the first extension part; the third extension part is formed by bending and extending from the second extension part, and the third extension part is perpendicular to the second extension portion and is parallel to the first extension part; and the fourth extension part is formed by bending and extending from the third extension part and is parallel to the third extension part.

Further, the second connection end comprises a first extension structure, a second extension structure, and a third extension structure; the first extension structure is perpendicularly arranged on the third extension part; the second extension structure is bent from the first extension structure until it is opposite to the third extension part and parallel to the third extension part; the third extension structure perpendicularly extends from the second extension structure along a direction parallel to the third extension part; and when the connection part is assembled to the casing, the third extension structure extends into the second installation space, and is connected to the resistance wire inserted into the connection hole.

Further, the first connection end is assembled with the second connection end by welding or riveting.

Further, the second installation spaces correspond to the first installation spaces in a one to one manner.

At least one embodiment of the present invention further provides a contactor device, comprising a contactor, a resistance wire, and a cable; the contactor further comprises the above-mentioned junction box; the first connection end is connected to the contactor; the resistance wire is connected to the second connection end; the main body is connected to the cable; a joint between the first connection end and the contactor, and a joint between the resistance wire and the second connection end are located on one side of the junction box; and a joint between the main body and the cable is located on the other, opposite side of the junction box.

Further, the joint between the resistance wire and the second connection end is located between the joint between the first connection end and the contactor and the joint between the main body and the cable.

Compared with the prior art, the contactor device and the junction box thereof in the present invention comprise a first connection end and a second connection end, wherein the first connection end may be used for connecting to a contactor, while the second connection end may be used for connecting to a resistance wire; in this way, the resistance wire may be connected to the second connection end without passing over the junction box, which is not only advantageous to fasten and install the junction box, but also facilitates the connection and installation of the cable.

In order to make the technical problems to be solved, the technical solutions and beneficial effects of the present invention more apparent, the present invention will be further described in detail in conjunction with the accompanying drawings and embodiments. It should be understood that specific embodiments described here are only used for illustrating the present invention and are not intended to limit the present invention.

Figure 4:
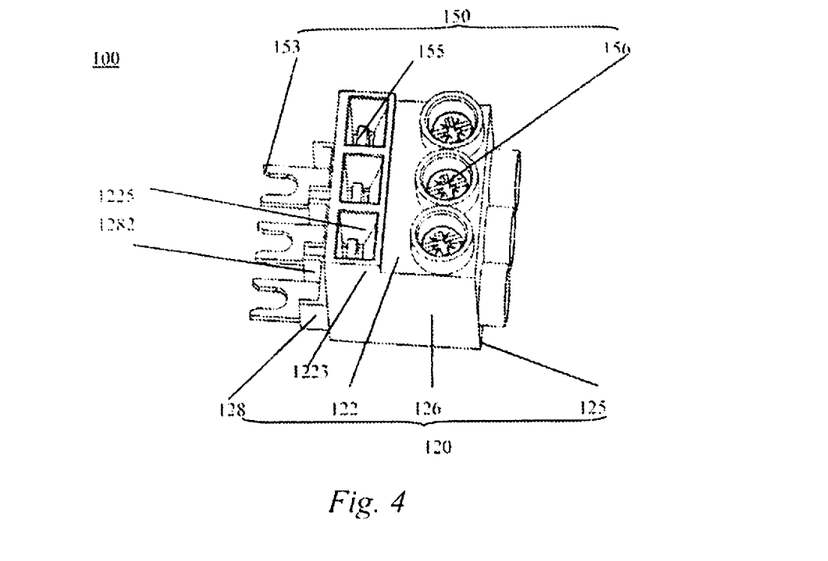
FIG. 4 is a structural schematic diagram of a junction box in an embodiment of the present invention.

FIG. 4 is a schematic diagram of a junction box 100 in an embodiment of the present invention. The junction box 100 comprises a casing 120 and a connection part 150. The connection part 150 is arranged in the casing 120, and can be connected to other elements.

Particularly, the casing 120 may be a hollow structure which is roughly a cuboid. The casing 120 comprises a first wall 122 such as a top wall (when the junction box 100 is at the location as shown in FIG. 4), a second wall 125 opposite to the first wall 122 and arranged at an interval such as a bottom wall (when the junction box 100 is at the location as shown in FIG. 4), two side walls 126 located between the first wall 122 and the second wall 125 and respectively connecting the first wall 122 and the second wall 125 on two sides, and a segmentation structure 128. The first wall 122, the second wall 125 and the two side walls 126 enclose an internal space; the segmentation structure 128 is arranged in the internal space enclosed by the first wall 122, the second wall 125 and the two side walls 126, and segment the internal space into a plurality of first installation spaces 1282. A protruding part 1223 is arranged at one end of the first wall 122, such as the left end (when the junction box 100 is at the location shown in FIG. 4). The protruding part 1223 is roughly perpendicular to the second wall 125 and extends along a direction away from the second wall 125 so that an outer surface of the first wall 122 is in a step shape. A second installation space 1225 is arranged on the protruding part 1223, and the second installation space 1225 is in communication with a corresponding first installation space 1282 for installing the connection part 150.

Figure 5:
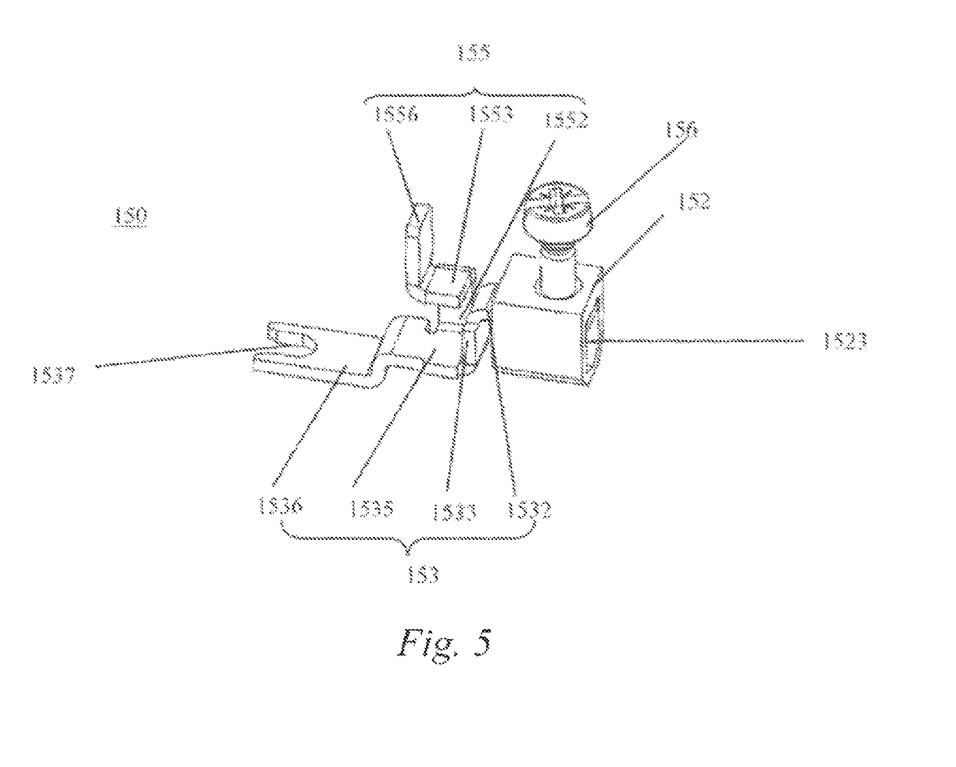
FIG. 5 is an enlarged schematic diagram of the connection part in FIG. 4.
Figure 6:
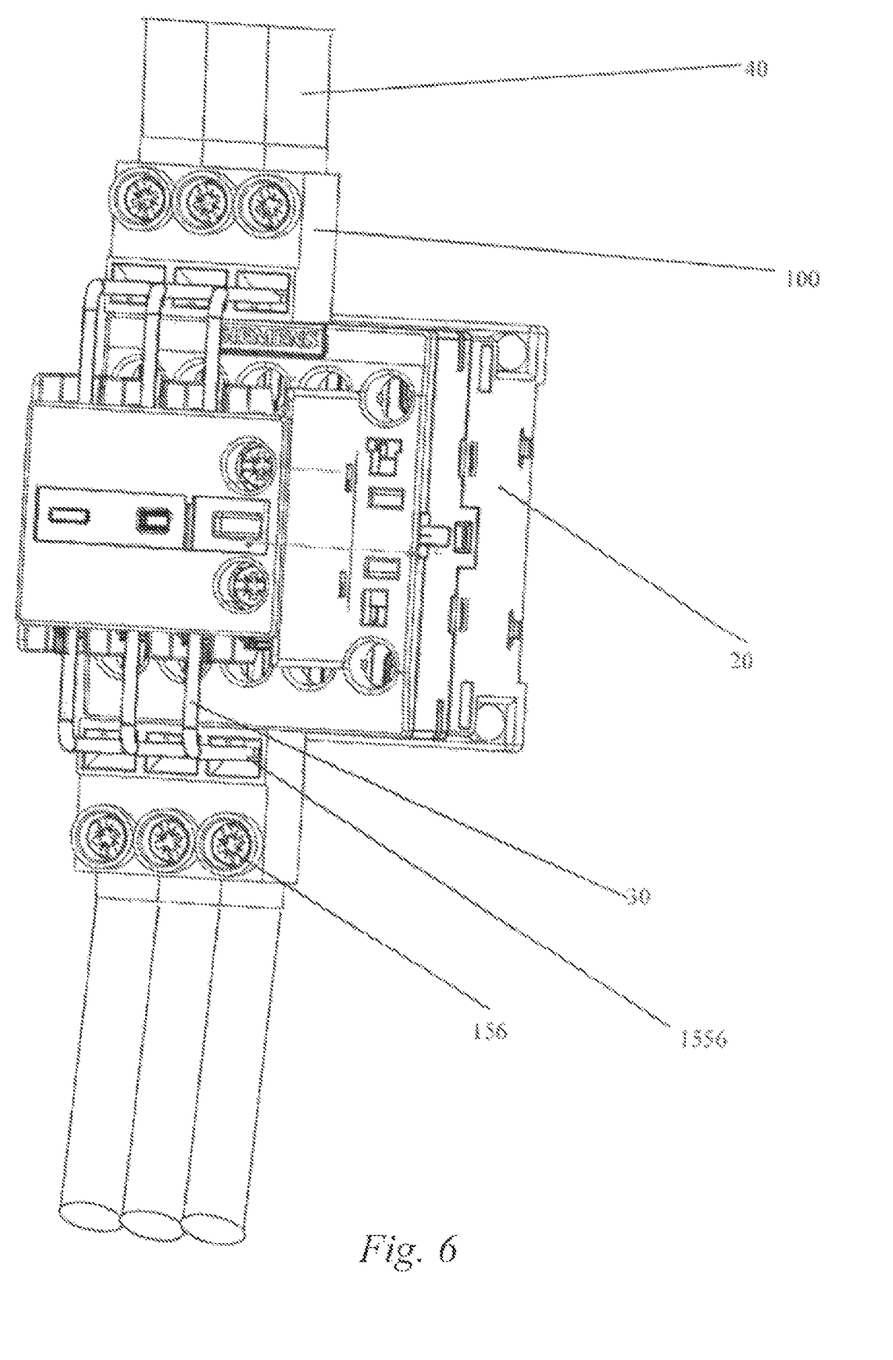
FIG. 6 is a schematic structural diagram of a contactor device formed by the junction box in FIG. 4 connected to the contactor, the resistance wire and the cable.

As shown in FIG. 5, the connection part 150 comprises a main body 152, a first connection end 153, a second connection end 155 and a bolt terminal 156, wherein the main body 152 may be arranged in the casing 120; an installation hole 1523 is formed inside of the main body 152; and the installation hole 1523 is used for accommodating a cable 40 (as shown in FIG. 6). The bolt terminal 156 passes through the first wall 122 and the main body 152, and is connected to the cable 40 which is located in the installation hole 1523.

A first end of the first connection end 153 is connected to the main body 152, and a second end of the first connection end 153 bends and extends from the first end of the first connection end 153 so as to connect to a contactor 20. In the embodiment shown in FIG. 5, the first connection end 153 comprises a first extension part 1532, a second extension part 1533, a third extension part 1535 and a fourth extension part 1536. The first extension part 1532 extends into the installation hole 1523 and is connected to the main body 152. The second extension part 1533 is formed by bending and extending downwards from the first extension part 1532 (when the first connection end 153 is at the location shown in FIG. 5) and is roughly perpendicular to the first extension part 1532. The third extension part 1535 is formed by bending and extending to the left from the second extension part 1533 (when the first connection end 153 is at the location shown in FIG. 5), and the third extension part 1535 is roughly perpendicular to the second extension part 1533 and is roughly parallel to the first extension part 1532. The fourth extension part 1536 is formed by bending and extending downwards from the third extension part 1535 and is roughly perpendicular to the third extension part 1535. The particular shapes of the first extension part 1532, the second extension part 1533, the third extension part 1535 and the fourth extension part 1536 may be adjusted according to the particular shapes, etc. of the first installation space 1282 so as to install the first connection end 153 in the corresponding first installation space 1282. In addition, in order to install the junction box 100 on the contactor 20 more steadily, a gap 1537 may be further arranged on an edge of the fourth extension part 1536.

A second connection end 155 is arranged on the first connection end 153. In the embodiment shown in FIG. 5, the second connection end 155 comprises a first extension structure 1552, a second extension structure 1553, and a third extension structure 1556. The first extension structure 1552 is arranged roughly perpendicular to one side of the third extension part 1535, and extends upwards from the third extension part 1535 (when the first connection end 153 is at the location shown in FIG. 5). The second extension structure 1553 bends from the first extension structure 1552 until it is opposite to the third extension part 1535 and roughly parallel to the third extension part 1553. The third extension structure 1556 extends upwards roughly perpendicularly from one side of the second extension structure 1553; and as shown in FIG. 4, when the connection part 150 is assembled to the casing 120, the third extension structure 1556 extends into the second installation space 1225 for connecting to the resistance wire 30 (as shown in FIG. 6).

Above is a structural schematic diagram of the junction box 100 in an embodiment of the present invention; hereafter the contactor device shown in FIG. 6 is taken as an example for briefly describing the connection relationships of the junction box 100 with the contactor 20, the resistance wire 30 and the cable 40.

As shown in FIG. 6, the junction box 100 may be connected to the contactor 20 by way of the first connection end 153. After connecting the junction box 100 to the contactor 20, the third extension structure 1556 of the second connection end 155 is located between the bolt terminal 156 and the contactor 20, i.e., with respect to the bolt terminal 156, the third extension structure 1556 of the second connection end 155 is closer to the contactor 20. In other words, the main body 152 is located on one side of the junction box 100, while the first connection end 153 and the second connection end 155 are located on the other, opposite side of the junction box 100; or that is to say, a joint between the first connection end 153 and the contactor 20 as well as a joint between the resistance wire 30 and the second connection end 155 are located on one side of the junction box 100, while a joint between the main body 152 and the cable 40 is located on the other, opposite side of the junction box 100; or that is to say, the joint between the resistance wire 30 and the second connection end 155 is located between the joint between the first connection end 153 and the contactor 20 and the joint between the main body 152 and the cable 40. Arranged in this way, the resistance wire 30 is connected to the third extension structure 1556 of the second connection end 155 on one side of the junction box 100, while the cable 40 is connected to the bolt terminal 156 on the other side of the junction box 100, that is, the resistance wire 30 may be connected to the third extension structure 1556 of the second connection end 155 without passing over the junction box 100, which is not only advantageous to fasten and install the junction box 100, but also facilitates the connection and installation of the cable 40.

Figure 7:
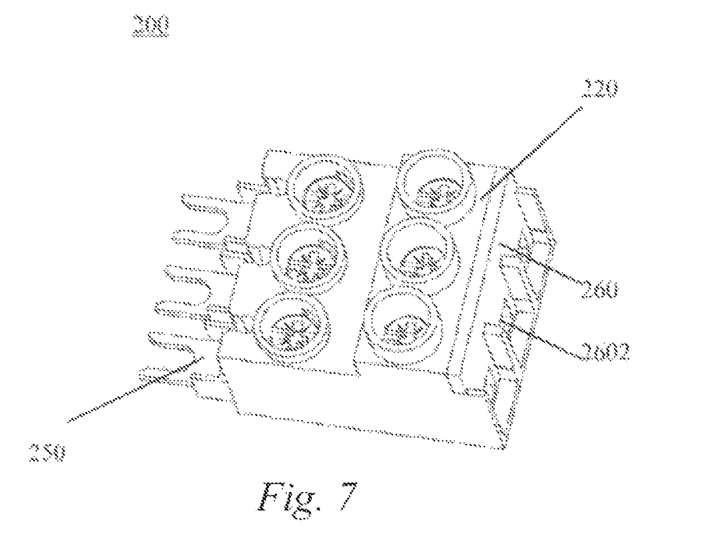
FIG. 7 is a structural schematic diagram of a junction box in another embodiment of the present invention.
Figure 8:
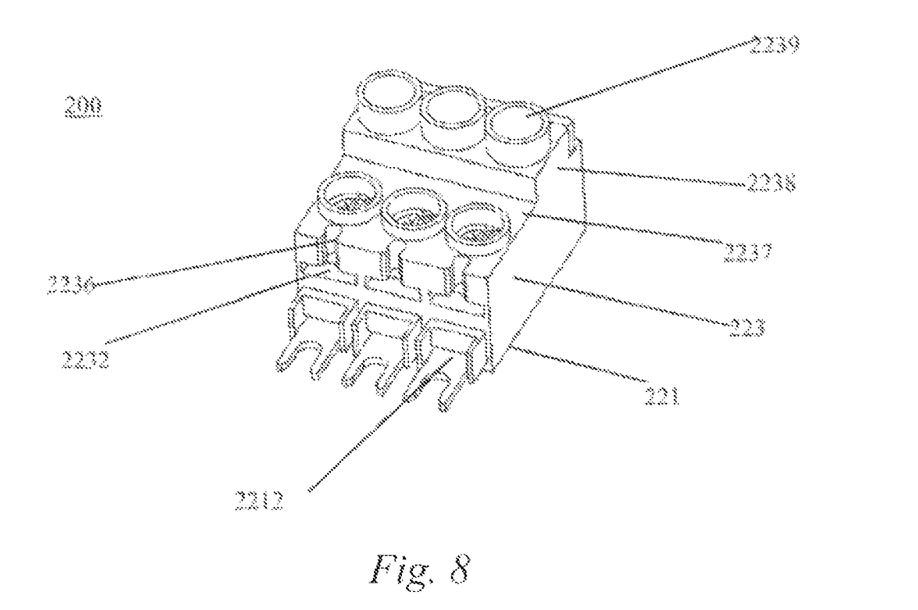
FIG. 8 is a schematic diagram of FIG. 7 at a different angle.

FIG. 7 and FIG. 8 are structural schematic diagrams of a junction box 200 in another embodiment of the present invention. As shown in FIGS. 7 and 8, the junction box 200 comprises a casing 220, a connection part 250 and a cover plate 260. The connection part 250 is arranged between the casing 220 and the cover plate 260, and can be connected to other elements.

As shown in FIG. 8, the casing 220 is of a two-layer structure, such as a first layer 221 and a second layer 223 arranged above the first layer 221. The first layer 221 comprises a plurality of first installation spaces 2212 arranged at intervals. The second layer 223 comprises a plurality of second installation spaces 2232 arranged at intervals. In the embodiment shown in FIG. 8, the second installation spaces 2232 correspond to the first installation spaces 2212 in a one to one manner. A plurality of connection holes 2236 are further formed on the second layer 223. The connection holes 2236 are in communication with the second installation spaces 2232 after penetrating the top of the second layer 223 roughly perpendicularly, and the connection holes 2236 correspond to the second installation spaces 2232 in a one to one manner.

In addition, the top of the second layer 223 is in a step shape, comprising a base part 2237 and a step part 2238. A plurality of punch holes 2239 for installing screws are respectively arranged on the base part 2237 and the step part 2238.

Figure 9:
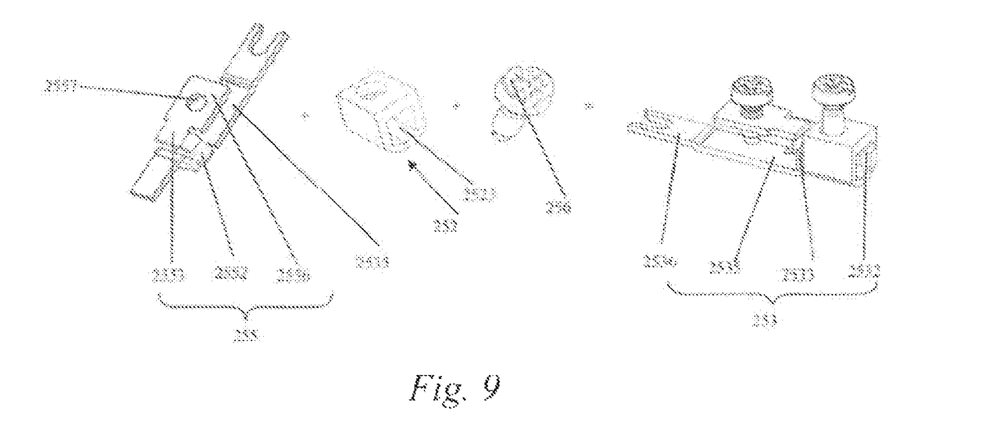
FIG. 9 is a structural schematic diagram of a connection part which can be used for the junction box of FIG. 7.

As shown in FIG. 9, the connection part 250 comprises a main body 252, a first connection end 253, a second connection end 255 and a bolt terminal 256, wherein the main body 252 may be installed in the first layer 221 of the casing 220; an installation hole 2523 is formed inside of the main body 252; and the installation hole 2523 is used for accommodating a cable. The bolt terminal 156 passes through the punch hole 2239 of the step part 2238 and the main body 252, and is connected to the cable which is located in the installation hole 2523.

A first end of the first connection end 253 is connected to the main body 252, and a second end of the first connection end 253 bends and extends from the first end of the first connection end 253 so as to connect to a contactor. In the embodiment shown in FIG. 9, the first connection end 253 comprises a first extension part 2532, a second extension part 2533, a third extension part 2535 and a fourth extension part 2536. The first extension part 2532 extends into the installation hole 2523 and is connected to the main body 252. The second extension part 2533 is formed by bending and extending downwards from the first extension part 2532 (when the first connection end 253 is at the location shown on the right side of FIG. 9) and is roughly perpendicular to the first extension part 2532. The third extension part 2535 is formed by bending and extending to the left from second extension part 2533 (when the first connection end 153 is at the location shown on the right side of FIG. 9), and the third extension part 2535 is roughly perpendicular to the second extension part 2533 and is roughly parallel to the first extension part 2532. The fourth extension part 2536 is formed by bending and extending upwards from the third extension part 2535 and is roughly parallel to the third extension part 2535. The particular shapes of the first extension part 2532, the second extension part 2533, the third extension part 2535 and the fourth extension part 2536 may be adjusted according to the particular shapes, etc. of the first installation space 2212 of the first layer 221 so as to install the first connection end 253 in the corresponding first installation space 2212.

A second connection end 255 is arranged on the first connection end 253. In the embodiment shown in FIG. 9, the second connection end 255 comprises a first extension structure 2552, a second extension structure 2553, and a third extension structure 2556. The first extension structure 2552 is arranged roughly perpendicular on one side of the third extension part 2535, and extends upwards from the third extension part 2535 (when the first connection end 253 is at the location shown on the right side of FIG. 9). The second extension structure 2553 bends from the first extension structure 2552 until it is opposite to the third extension part 2535 and roughly parallel to the third extension part 2535. The third extension structure 2556 extends from one side of the second extension structure 2553 along a direction roughly parallel to the third extension part 2535. When the connection part 250 is assembled to the casing 220, the third extension structure 2556 extends into the second installation space 2232, and the bolt terminal 156 screws into a through hole 2557 on the third extension structure 2556 after passing through a punch hole 2239 on the base part 2237 so as to fix the second connection end 255 with the second layer 223; and in this case, the third extension structure 2556 may be used for connecting to a resistance wire inserted into the connection hole 2236.

The cover plate 260 is arranged on the end of the casing 220 for connecting to the cable, and is in contact with the step part 2238. A plurality of plug holes 2602 are arranged at intervals on the cover plate 260, and the plug holes 2602 are arranged corresponding to the through holes 2239 on the step part 2238, for inserting the cable into the casing 220 so as to connect to a corresponding main body 252.

Figure 10:
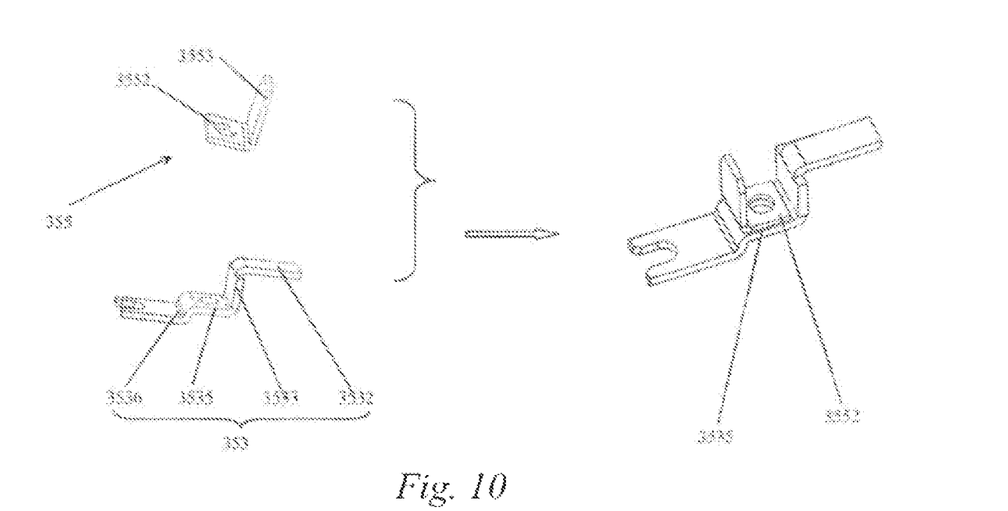
FIG. 10 is a structural schematic diagram of a first connection end and a second connection end of a junction box in an embodiment of the present invention.

FIG. 10 is a structural schematic diagram of a first connection end 353 and a second connection end 355 of a junction box in an embodiment of the present invention. As shown in FIG. 10, the structure of the first connection end 353 is basically the same as the structure of the first connection end 153 in FIG. 5, also comprising a first extension part 3532, a second extension part 3533, a third extension part 3535 and a fourth extension part 3536. The second connection end 355 is roughly in an L shape, comprising a first portion 3552 and a second portion 3553 roughly perpendicular to the first portion 3552. The first portion 3552 of the second connection end 355 is in butt-joint to the third extension part 3535 of the first connection end 353, and the first portion 3552 of the second connection end 355 and the third extension part 3535 of the first connection end 353 may be assembled together in the manner of welding or riveting, etc.

To sum up, the junction box provided in the embodiments of the present invention has the following advantages:

1. The junction box provided in the embodiments of the present invention comprises a first connection end and a second connection end, wherein the first connection end may be used for connecting to a contactor, while the second connection end may be used for connecting to a resistance wire; in this way, the resistance wire may be connected to the second connection end without passing over the junction box, which is not only advantageous for fastening and installing the junction box, but also facilitates the connection and installation of the cable.

2. The junction box provided in the embodiments of the present invention can also be used in a standard contactor, and in this case, the second connection end can also be used as a signal terminal for providing a signal of the junction box so as to perform a test.

The above-mentioned are merely preferred example embodiments of the present invention, which are not intended to limit the present invention; and any modifications, equivalent replacements, improvements, etc. made within the spirit and principles of the present invention shall be covered in the scope of protection of the present invention.

The invention claimed is:

1. A junction box, comprising:
   a casing, the casing including a first installation space and a second installation space; and
   a connection part, arranged in the casing, the connection part including
     a main body, for connecting to a cable,
     a first connection end, connected to the main body and located in the first installation space, for connecting to a contactor, and
     a second connection end, arranged on the first connection end and located in the second installation space, an installation hole being formed inside the main body,
   the first connection end including a first extension part, a second extension part, a third extension part, and a fourth extension part;
     the first extension part extending into the installation hole and being connected to the main body;
     the second extension part being formed by bending and extending from the first extension part and being perpendicular to the first extension part;
     the third extension part being formed by bending and extending from the second extension part, and the third extension part being perpendicular to the second extension portion and being parallel to the first extension part; and
     the fourth extension part being formed by bending and extending from the third extension part and being parallel to the third extension part.

2. The junction box of claim 1, wherein the main body is located on one side of the junction box, and the first connection end and the second connection end are located on the other, opposite side of the junction box.

3. A contactor device, comprising:
   a contactor, including the junction box of claim 2, the first connection end being connected to the contactor;
   a resistance wire connected to the second connection end; and
   a cable, the main body being connected to the cable, a joint between the first connection end and the contactor and a joint between the resistance wire and the second connection end being located on one side of the junction box, and a joint between the main body and the cable being located on the other, opposite side of the junction box.

4. The contactor device of claim 3, wherein the joint between the resistance wire and the second connection end is located between the joint between the first connection end and the contactor and the joint between the main body and the cable.

5. The junction box of claim 1, wherein
the second connection end is arranged on the first connection end;
the second connection end comprises a first extension structure, a second extension structure, and a third extension structure;
the first extension structure is perpendicularly arranged on the third extension part and extends from the third extension part;
the second extension structure is bent from the first extension structure until it is opposite to the third extension part and parallel to the third extension part;
the third extension structure perpendicularly extends from the second extension structure; and
when the connection part is assembled to the casing, the third extension structure extends into the second installation space and is used for connecting to a resistance wire.

6. The junction box of claim 1, wherein
the casing comprises a first layer and a second layer arranged above the first layer;
the first layer comprises a plurality of the first installation spaces arranged at intervals; and
the second layer comprises a plurality of the second installation spaces arranged at intervals.

7. The junction box of claim 6, wherein the second installation spaces respectively correspond to the first installation spaces in a one to one manner.

8. The junction box of claim 6, wherein
a plurality of connection holes used for installing the resistance wire are further formed on the second layer;
the connection holes are in communication with the second installation spaces after penetrating the top of the second layer; and
the connection holes correspond to the second installation spaces in a one to one manner.

9. The junction box of claim 8, wherein
the second connection end comprises a first extension structure, a second extension structure, and a third extension structure;
the first extension structure is perpendicularly arranged on the third extension part;
the second extension structure is bent from the first extension structure until it is opposite to the third extension part and parallel to the third extension part;
the third extension structure perpendicularly extends from the second extension structure along a direction parallel to the third extension part; and
when the connection part is assembled to the casing, the third extension structure extends into the second installation space, and is connected to the resistance wire inserted into the connection hole.

10. The junction box of claim 1, wherein the installation hole is used for accommodating the cable.

11. The junction box of claim 1, wherein the first connection end is assembled with the second connection end by welding or riveting.

12. The junction box of claim 1, wherein the second installation space respectively correspond to the first installation space in a one to one manner.

13. A contactor device, comprising:
a contactor, including the junction box of claim 1, the first connection end being connected to the contactor;
a resistance wire connected to the second connection end; and
a cable, the main body being connected to the cable, a joint between the first connection end and the contactor and a joint between the resistance wire and the second connection end being located on one side of the junction box, and a joint between the main body and the cable being located on the other, opposite side of the junction box.

14. The contactor device of claim 13, wherein the joint between the resistance wire and the second connection end is located between the joint between the first connection end and the contactor and the joint between the main body and the cable.

15. A contactor device, comprising:
a contactor, including a junction box including
a casing, the casing including a first installation space and a second installation space; and
a connection part, arranged in the casing, the connection part including
a main body, for connecting to a cable,
a first connection end, connected to the main body and located in the first installation space, for connecting to a contactor, and
a second connection end, arranged on the first connection end and located in the second installation space, the first connection end being connected to the contactor;
a resistance wire connected to the second connection end; and
a cable, the main body being connected to the cable, a joint between the first connection end and the contactor and a joint between the resistance wire and the second connection end being located on one side of the junction box, and a joint between the main body and the cable being located on the other, opposite side of the junction box.

16. The contactor device of claim 15, wherein the joint between the resistance wire and the second connection end is located between the joint between the first connection end and the contactor and the joint between the main body and the cable.

17. The contactor device of claim 15, wherein the first connection end is assembled with the second connection end by welding or riveting.

18. The contactor device of claim 15, wherein the casing comprises a first layer and a second layer arranged above the first layer,
the first layer comprises a plurality of the first installation spaces arranged at intervals; and
the second layer comprises a plurality of the second installation spaces arranged at intervals, the second installation spaces respectively correspond to the first installation spaces in a one to one manner.

* * * * *